(12) United States Patent
Agarwal et al.

(10) Patent No.: US 11,016,175 B2
(45) Date of Patent: May 25, 2021

(54) TRANSPORTATION INFRASTRUCTURE COMMUNICATION AND CONTROL

(71) Applicant: Ford Global Technologies, LLC, Dearborn, MI (US)

(72) Inventors: Siddharth Agarwal, Dearborn, MI (US); Ankit Girish Vora, Dearborn, MI (US); Juan Enrique Castorena Martinez, Southfield, MI (US); Faizan Shaik, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 16/156,783

(22) Filed: Oct. 10, 2018

(65) Prior Publication Data

US 2020/0116827 A1    Apr. 16, 2020

(51) Int. Cl.
| | |
|---|---|
| *G01S 7/48* | (2006.01) |
| *G01S 17/42* | (2006.01) |
| *G01S 17/86* | (2020.01) |
| *G01S 17/931* | (2020.01) |

(52) U.S. Cl.
CPC ........... *G01S 7/4806* (2013.01); *G01S 17/42* (2013.01); *G01S 17/86* (2020.01); *G01S 17/931* (2020.01)

(58) Field of Classification Search
CPC .......... G01S 7/4806; G01S 7/42; G01S 17/42; G01S 17/86
USPC ....................................................... 702/159
See application file for complete search history.

(56) References Cited

U.S. PATENT DOCUMENTS

| | | | |
|---|---|---|---|
| 9,297,899 B2 | 3/2016 | Newman et al. | |
| 9,412,173 B2 | 8/2016 | Leonard et al. | |
| 10,710,599 B2* | 7/2020 | Nobre | ................ G05D 1/0274 |
| 2011/0125344 A1* | 5/2011 | An | ................ G08G 1/096725 |
| | | | 701/2 |
| 2016/0363647 A1* | 12/2016 | Zeng | ................ G06K 9/00798 |
| 2018/0130176 A1 | 5/2018 | Castorena Martinez | |
| 2018/0188039 A1* | 7/2018 | Chen | ................ G06K 9/00798 |
| 2018/0202814 A1* | 7/2018 | Kudrynski | ............ G01S 17/89 |
| 2018/0364045 A1* | 12/2018 | Williams | ............... B25J 9/1679 |
| 2019/0086545 A1* | 3/2019 | Mooney | ................ G01S 17/87 |
| 2019/0120946 A1* | 4/2019 | Wheeler | ................ G01S 17/89 |
| 2019/0226853 A1* | 7/2019 | Kubiak | ................ G06T 3/0043 |
| 2020/0068345 A1* | 2/2020 | Ondruska | ............. G06T 19/006 |

FOREIGN PATENT DOCUMENTS

| | | |
|---|---|---|
| DE | 102016211805 A1 | 4/2017 |
| JP | 2012010036 A | 1/2012 |

OTHER PUBLICATIONS

Jeong, et. al., "Complex Urban LiDAR Data Set", retrieved from Internet URL: http://irap.kaist.ac.kr/dataset/papers/ICRA2018_dataset.pdf (8 pages).

* cited by examiner

*Primary Examiner* — Ricky Go
(74) *Attorney, Agent, or Firm* — Frank A. MacKenzie; Bejin Bieneman PLC (57) ABSTRACT

A reference pose graph can be generated from first point cloud data collected at each of a plurality of mobile nodes. A location of a stationary node can be specified based on the reference pose graph and second point cloud data collected by the stationary node.

20 Claims, 9 Drawing Sheets

TRANSPORTATION INFRASTRUCTURE COMMUNICATION AND CONTROL

BACKGROUND

A LIDAR (Light Detection and Ranging) sensor can map locations of objects in three dimensions with great precision, but only if the LIDAR sensor's location with respect to objects being mapped is known with a high degree of precision. However, it can be difficult to obtain a location of a LIDAR sensor, e.g., a sensor fixedly mounted to roadside infrastructure, with sufficient precision for the LIDAR sensor to provide reliable data about objects in an area within the sensor's field of view. For example, global positioning system (GPS) sensors, often (e.g., in "urban canyon" environments) even when enhanced by real-time kinematic (RTK) positioning, may provide a location, e.g., of a LIDAR sensor with an accuracy of at best within a few meters. However, accurate LIDAR data can depend on localizing a LIDAR sensor to within a few centimeters.

DETAILED DESCRIPTION

Figure 1:
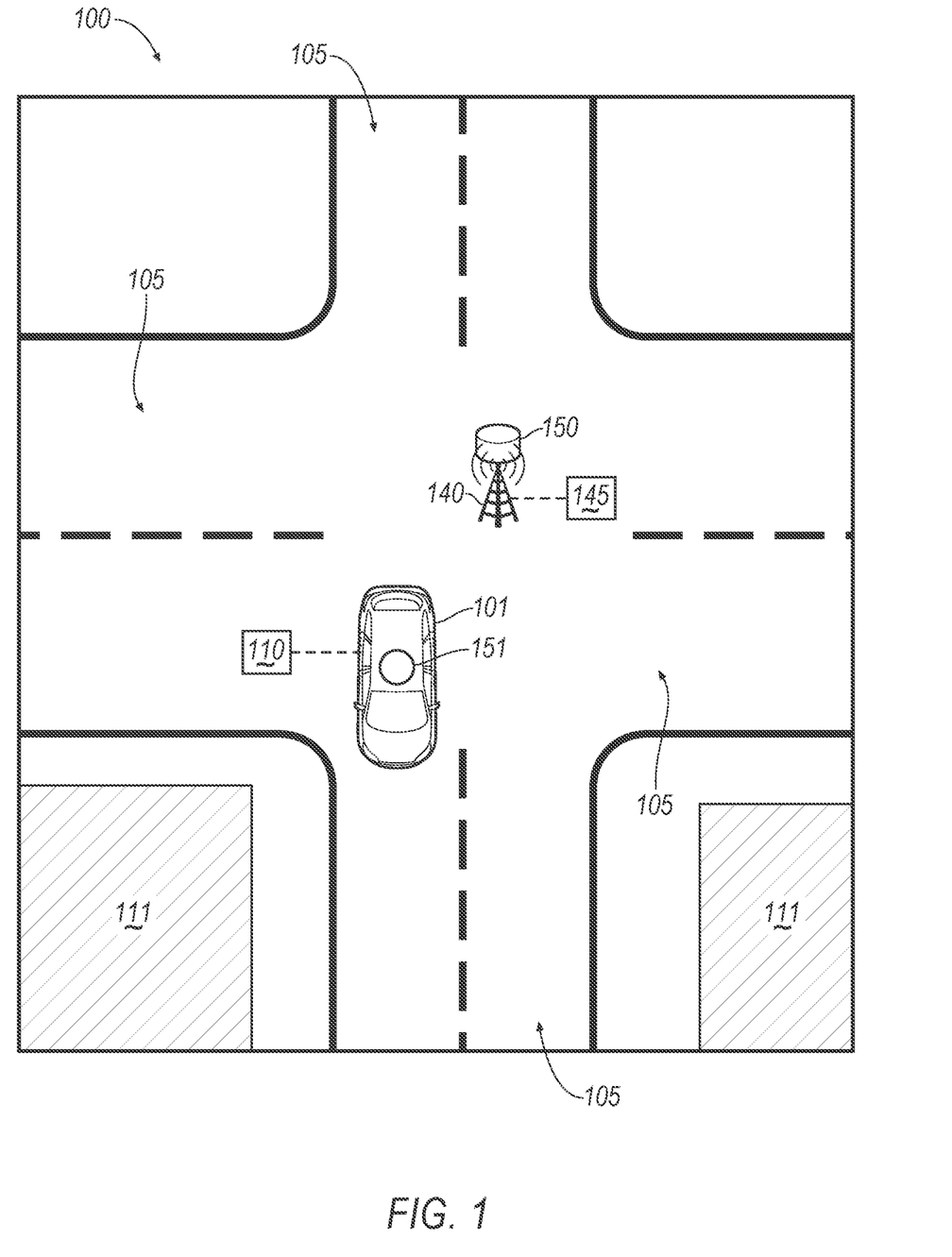
FIG. 1 is a block diagram of a traffic area including an example infrastructure communications and control node.

FIG. 1 is a block diagram of a traffic area 100 including an example infrastructure communications and control node 140, having mounted thereto a LIDAR sensor 150. The node 140 can further include elements (not shown for ease of illustration) such as a computer to analyze LIDAR data, communications elements for wired or, more typically wireless communications, e.g., with vehicles 101 in the traffic area 100. For example, the node 140 can provide to vehicles, e.g., via vehicle-to-infrastructure (V2I) communications, LIDAR 150 data and/or data derived therefrom, e.g., data providing a map of the area 100 and/or data specifying a location or locations of objects in the area 100, e.g., with respect to infrastructure elements such as roads 105, buildings 111, bridges, crosswalks, intersections.

A problem addressed herein is determining a location of the node 140 and LIDAR 150 with sufficient accuracy, typically to within less than 10 centimeters, to provide LIDAR 150 data, or data derived therefrom, so that vehicles 101 in the area 100 can rely on the LIDAR 150 for operations, such as navigating in the area 100, including braking and/or decelerating, accelerating, and/or steering. As disclosed herein, a mapping vehicle 101 including a mobile LIDAR 151 can be used to obtain data, typically presented as a pose graph or series of pose graphs, to determine, or calibrate, a location of the node 140 LIDAR 150.

A method comprises generating a reference pose graph from first point cloud data collected at each of a plurality of mobile nodes; and specifying a location of a stationary node based on the reference pose graph and second point cloud data collected by the stationary node. The first and second point cloud data can be LIDAR sensor data. The stationary node can include a LIDAR sensor and at least one of a two-dimensional imaging sensor, a radar, or an ultrasonic sensor. The reference pose graph can be generated by applying an iterative scan matching process to the first point cloud data. The method can further comprise detecting an object at the stationary node, and specifying an object location according to the location of the stationary node. The method can further comprise transmitting the object location to a vehicle. The method can further comprise, in the vehicle, actuating a component according to the object location. The location of the stationary node can be specified in three dimensions.

A system, comprises a computer comprising a processor and a memory, the memory storing instructions executable by the processor to generate a reference pose graph from first point cloud data collected at each of a plurality of mobile nodes; and specify a location of a stationary node based on the reference pose graph and second point cloud data collected by the stationary node. The first and second point cloud data can be LIDAR sensor data. The stationary node can include a LIDAR sensor and at least one of a two-dimensional imaging sensor, a radar, or an ultrasonic sensor. The reference pose graph can be generated by applying an iterative scan matching process to the first point cloud data. The instructions can further include instructions to detect an object at the stationary node, and specify an object location according to the location of the stationary node. The instructions can further include instructions to transmit the object location to a vehicle. The vehicle can actuate a component according to the object location. The location of the stationary node can be specified in three dimensions.

A system comprises a mobile LIDAR sensor; a stationary infrastructure node; a LIDAR sensor mounted to the infrastructure node; and a computer comprising a processor and a memory, the memory storing instructions executable by the processor to: generate a reference pose graph from first point cloud data collected by the mobile LIDAR sensor; and specify a location of a stationary node based on the reference pose graph and second point cloud data collected by the stationary node. The system can further comprise at least one of a two-dimensional imaging sensor, a radar, or an ultrasonic sensor mounted to the stationary node. The reference pose graph can be generated by applying an iterative scan matching process to the first point cloud data. The instructions can further include instructions to detect an object at the stationary node, and specify an object location according to the location of the stationary node.

A vehicle 101, including a mapping vehicle 101, typically includes a computer 110 that can receive and store data from sensors including a LIDAR sensor 151. The computer 110 includes a processor and a memory such as are known. The memory includes one or more forms of computer-readable media, and stores instructions executable by the computer 110 for performing various operations, including as disclosed herein.

The computer 110 may include programming to operate one or more of vehicle 101 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

Thus, the computer 110 may operate a vehicle 101 in an autonomous, a semi-autonomous mode, or a non-autonomous (or manual) mode. For purposes of this disclosure, an autonomous mode is defined as one in which each of vehicle 101 propulsion, braking, and steering are controlled by the computer 110; in a semi-autonomous mode the computer 110 controls one or two of vehicles 101 propulsion, braking, and steering; in a non-autonomous mode a human operator controls each of vehicle 101 propulsion, braking, and steering.

The computer 110 may include or be communicatively coupled to, e.g., via a vehicle 101 communications bus as described further below, more than one processor, e.g., included in electronic controller units (ECUs) or the like included in the vehicle for monitoring and/or controlling various vehicle components, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 101 network, the computer 110 may transmit messages to various devices in the vehicle and/or receive messages from the various devices, e.g., sensors, an actuator, a human machine interface (HMI), etc. Alternatively or additionally, in cases where the computer 110 actually comprises a plurality of devices, the vehicle 101 communication network may be used for communications between devices represented as the computer 110 in this disclosure. Further, as mentioned below, various controllers and/or sensors may provide data to the computer 110 via the vehicle communication network.

Vehicle 101 sensors may include a variety of devices such as are known to provide data to the computer 110. For example, the sensors may include one or more LIDAR) sensors 151, etc., disposed on a top of the vehicle 101, behind a vehicle 101 front windshield, around the vehicle 101, etc., that provide relative locations, sizes, and shapes of objects surrounding the vehicle 101. Other sensors are not shown to avoid cluttering the illustration, but could include, e.g., one or more radar sensors fixed to vehicle 101 bumpers may provide data to provide locations of the objects, second vehicles 101, etc., relative to the location of the vehicle 101. The sensors may further alternatively or additionally, for example, include camera sensor(s), e.g. front view, side view, etc., providing images from an area surrounding the vehicle 101.

Vehicle 101 actuators are implemented via circuits, chips, or other electronic and or mechanical components that can actuate various vehicle subsystems in accordance with appropriate control signals as is known. The actuators may be used to control components, including braking, acceleration, and steering of a vehicle 101.

In the context of the present disclosure, a vehicle component is one or more hardware components adapted to perform a mechanical or electro-mechanical function or operation—such as moving the vehicle 101, slowing or stopping the vehicle 101, steering the vehicle 101, etc. Non-limiting examples of components include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface, e.g., including a radio frequency transceiver, with devices outside of the vehicle 101, e.g., through a vehicle-to-vehicle (V2V) or vehicle-to-infrastructure (V2X) wireless communications to another vehicle, to an infrastructure node 140 (typically via direct radio frequency communications) and/or, e.g., via a wide area network such as the Internet using wired and/or wireless mechanisms, a remote server computer. In short, communications modules could include one or more mechanisms by which the computers 110 of vehicles 101 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module include cellular, Bluetooth, IEEE 802.11, dedicated short range communications (DSRC), and/or wide area networks (WAN), including the Internet, providing data communication services.

In general, a vehicle computer 110, node computer, etc., could communicate via one or more mechanisms such as discussed herein. These could include one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure node 140 includes a physical structure such as a tower or other support structure (e.g., a pole, a box mountable to a bridge support, cell phone tower, road sign support, etc.) on which infrastructure sensors, including the LIDAR 150, as well as an infrastructure communications module and a node computer 145 can be mounted, stored, and/or contained, and powered, etc. One infrastructure node 140 is shown in FIG. 1 for ease of illustration, but a system could and likely would include tens, hundreds, or thousands of nodes 140. The infrastructure node 140 is typically stationary, i.e., fixed to and not able to move from a specific geographic location.

Infrastructure node 140 sensors may include one or more sensors such as described above for the vehicle 101 sensors, e.g., lidar, radar, two-dimensional imaging sensors, i.e., cameras, ultrasonic sensors, etc. The infrastructure sensors are fixed or stationary with the infrastructure node 140. That is, each sensor is mounted to the infrastructure node so as to have a substantially unmoving and unchanging field of view, e.g., of a traffic area 100. Thus, a node 140 location specified as described herein can localize, i.e., provide a two- or three-dimensional set of coordinates for each of various sensors fixed to the node 140 (even including sensors that are not LIDAR sensors). Thus, the node 140 can be provided in an area 100 to provide data about the area 100, including data about objects such as vehicles, pedestrians, bicycles, etc., as well as other moving and/or stationary objects. An area 100 can be defined as an area within a field of view of a node 140 lidar 150 or, alternatively, as a specified distance, e.g., a radius, a rectangle, etc., around the node 140, or simply as a specified area that includes the node 140.

A node 140 communications module and computer 145 typically have features in common with the vehicle computer 110 and vehicle communications module, and therefore will not be described further to avoid redundancy. Although not shown for ease of illustration, the infrastructure node 140 also includes a power source such as a battery, solar power cells, and/or a connection to a power grid.

FIGS. 2-8 illustrate examples of a pose graph 200. In the context of this disclosure, a "pose graph" is a representation of a plurality of locations, e.g., nodes 205, wherein each location is a location from which a sensor 150, 151 collected point cloud data 215.

Figure 2:
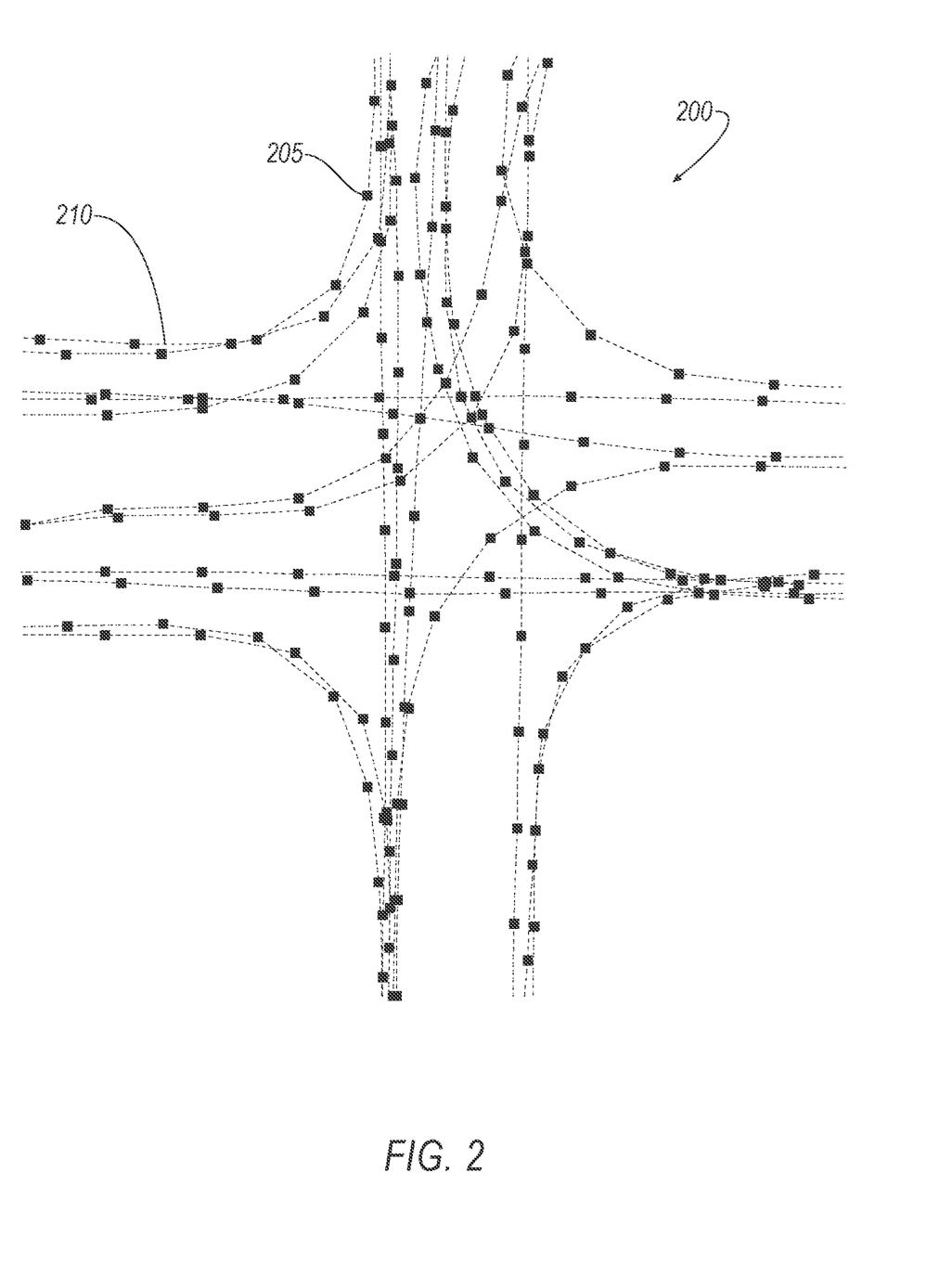
FIG. 2 illustrates a pose graph of nodes representing LIDAR data collection locations.

FIG. 2 illustrates a pose graph 200 of data collection nodes 205, i.e., each node 205 represents a LIDAR data collection location. LIDAR data is of course typically three dimensional, i.e., a three dimensional point cloud. The present figures are shown as two-dimensional top-down views for ease and clarity of illustration, but it is to be understood that the description herein applies to 3D lidar point cloud data. The nodes 205 are shown by squares, only one of which is labeled with the reference numeral 205 in each of the figures for ease of illustration. Further, the lines 210 connecting the nodes 205 represent a possible path of travel of a mapping or data collection vehicle 101. That is, a vehicle 101 can travel through an area 100, and at each location represented by a node 205, can collect a conventional LIDAR point cloud.

Figure 3:
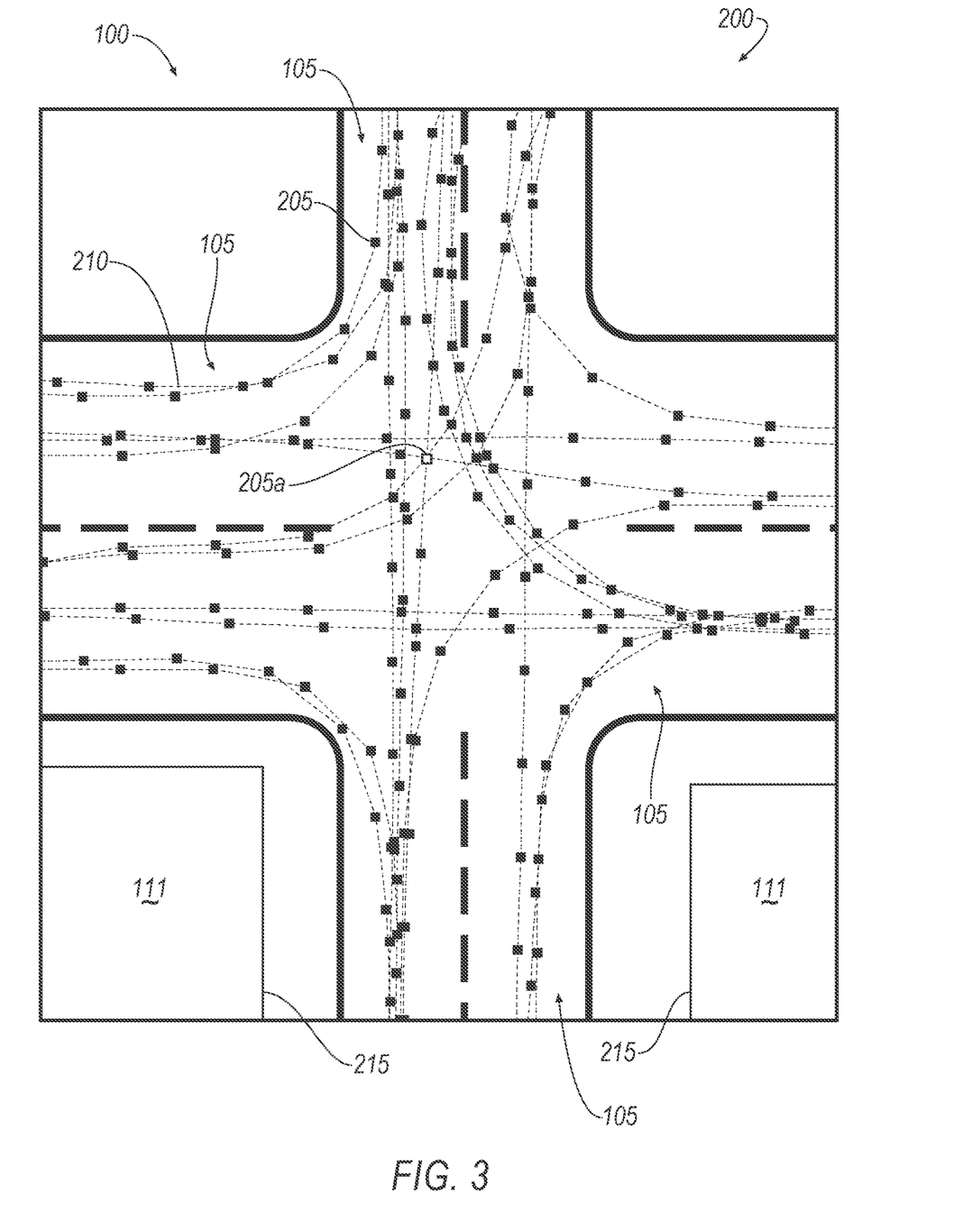
FIG. 3 illustrates a pose graph of nodes representing LIDAR data collection locations and a respective point cloud map collected at one of the collections nodes.

For example, FIG. 3 illustrates a pose graph 200 of a node 205 representing a LIDAR 151 data collection locations and a representation of point cloud data 215 collected at the node 205a. The nodes 205 is highlighted in the illustration by being shown with no shading in addition to being labeled with reference numeral 205a.

Figure 4:
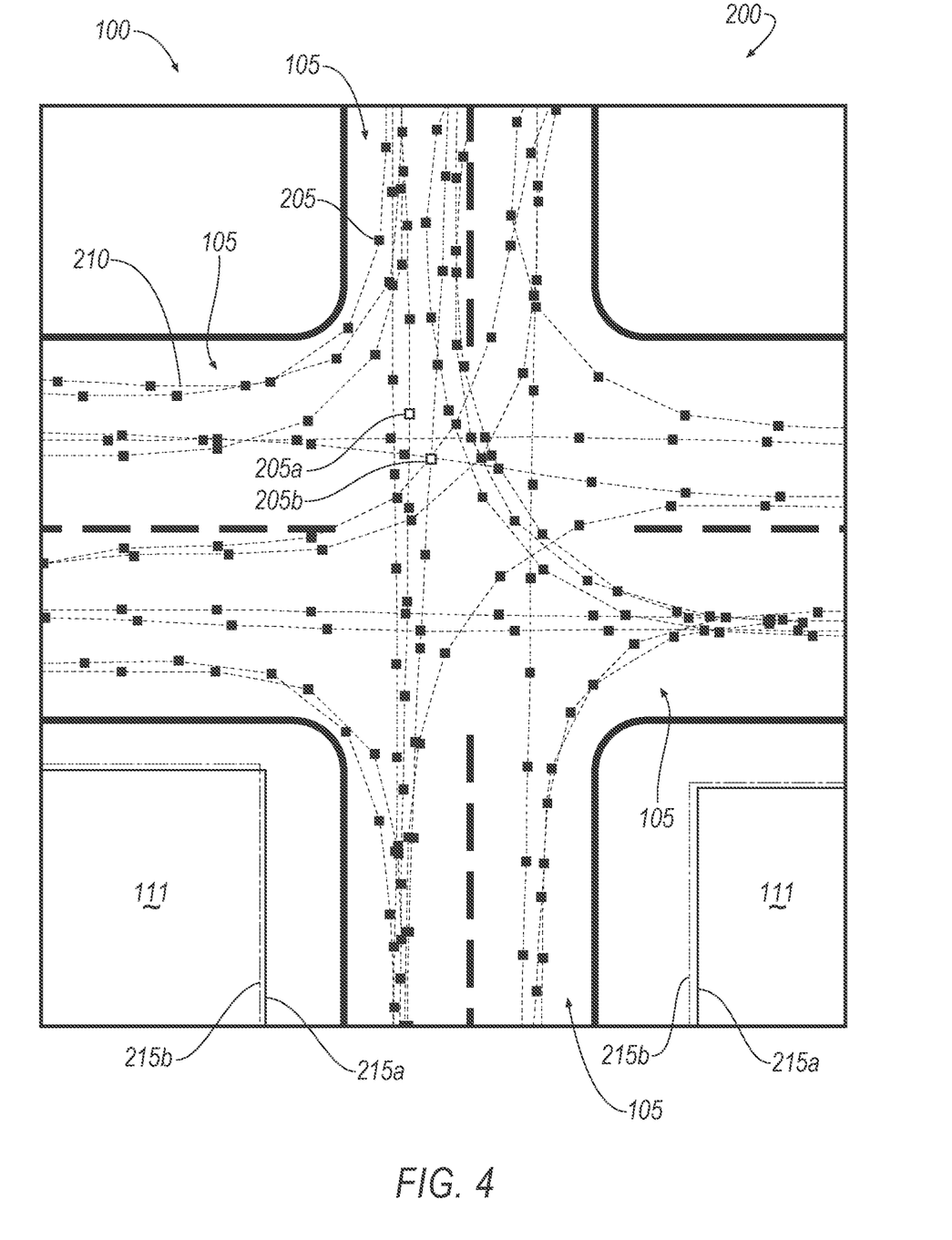
FIG. 4 illustrates a pose graph of nodes representing LIDAR data collection locations and respective point cloud maps collected by two of the nodes.

FIG. 4 illustrates a pose graph 200 of a nodes 205 representing LIDAR 151 data collection locations and a representation of point cloud data 215a, 215b collected at the nodes 205a, 205b. The point cloud data 215a was collected at the node 205a. The point cloud data 215b shown in FIG. 3 was collected from a second node, i.e., a node 205b other than the node 205a. The nodes 205a, 205b are highlighted in the illustration by being shown with no shading in addition to being labeled with reference numeral 205a. In this example, node 205 locations are specified by GPS coordinates (i.e., conventional latitude and longitude geocoordinates), which, as noted above, can have an error of up to several, e.g., 2 to 3, meters. Thus, although the point cloud data 215a, 215b represents the same buildings 111, the respective point cloud data 215a, 215b, shows each of the buildings 111 in different locations, i.e., the point cloud data 215a, 215b is not aligned or calibrated to one another. Although point cloud data 215 from only two nodes 205 is shown in FIG. 3, similarly distinct point cloud data 215 from other nodes 205 in the pose graph 200 could be shown.

Figure 5:
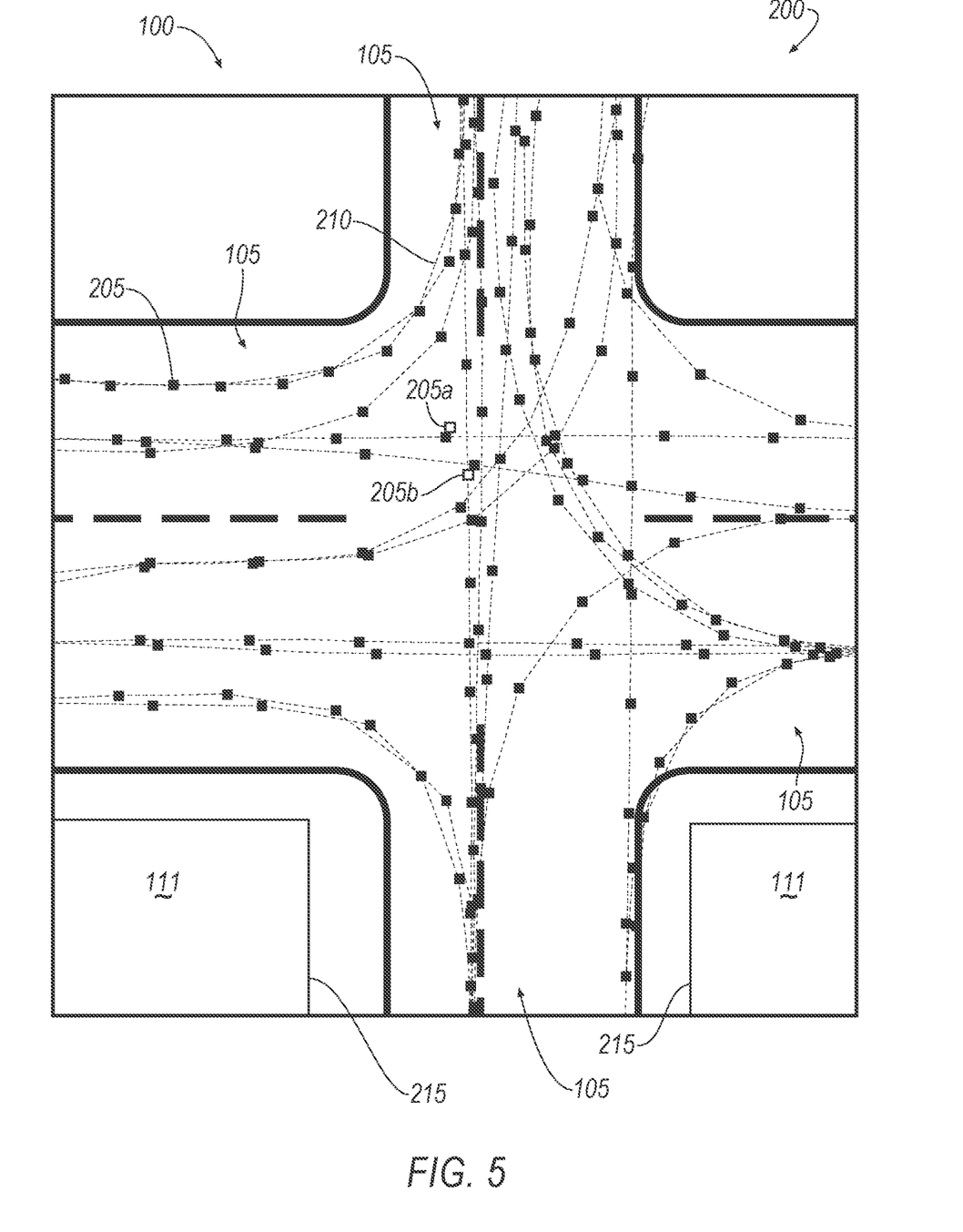
FIG. 5 illustrates a pose graph of nodes representing LIDAR data collection locations and point cloud maps collected by two of the nodes rendered after a scan matching process.

FIG. 5 illustrates a pose graph 200 of nodes 205, including the nodes 205a, 205b of FIG. 3, representing LIDAR data collection locations and respective point cloud maps collected by two the nodes 205a, 205b, after a LIDAR scan matching process using a technique for matching lidar scans, e.g., where the lidar scans are collected at various points such as nodes 205, by mobile devices, such as a mapping vehicle 205. As can be seen, the respective point cloud data 215a, 215b from the nodes 205a, 205b is now substantially aligned such that FIG. 5 illustrates only one set of point cloud data 215. In other words, data 215 from the nodes 205a, 205b is calibrated or aligned so that it may be located according to a common coordinate system, e.g., a for a map of an area 200. Further, point cloud data 215 from each of the nodes 205 shown in FIG. 4 could be iteratively aligned or calibrated so that data 215 from each of the nodes 205 could be placed or located according to the common coordinate system. Yet further, although it is difficult to see in the figures, it is to be understood that, as point cloud data 215 from various nodes 205 is calibrated or aligned, the respective nodes 205 generating the point cloud data also move in the pose graph, typically a distance of two meters or less (which is why the movement is difficult to illustrate in the drawings).

Figure 6:
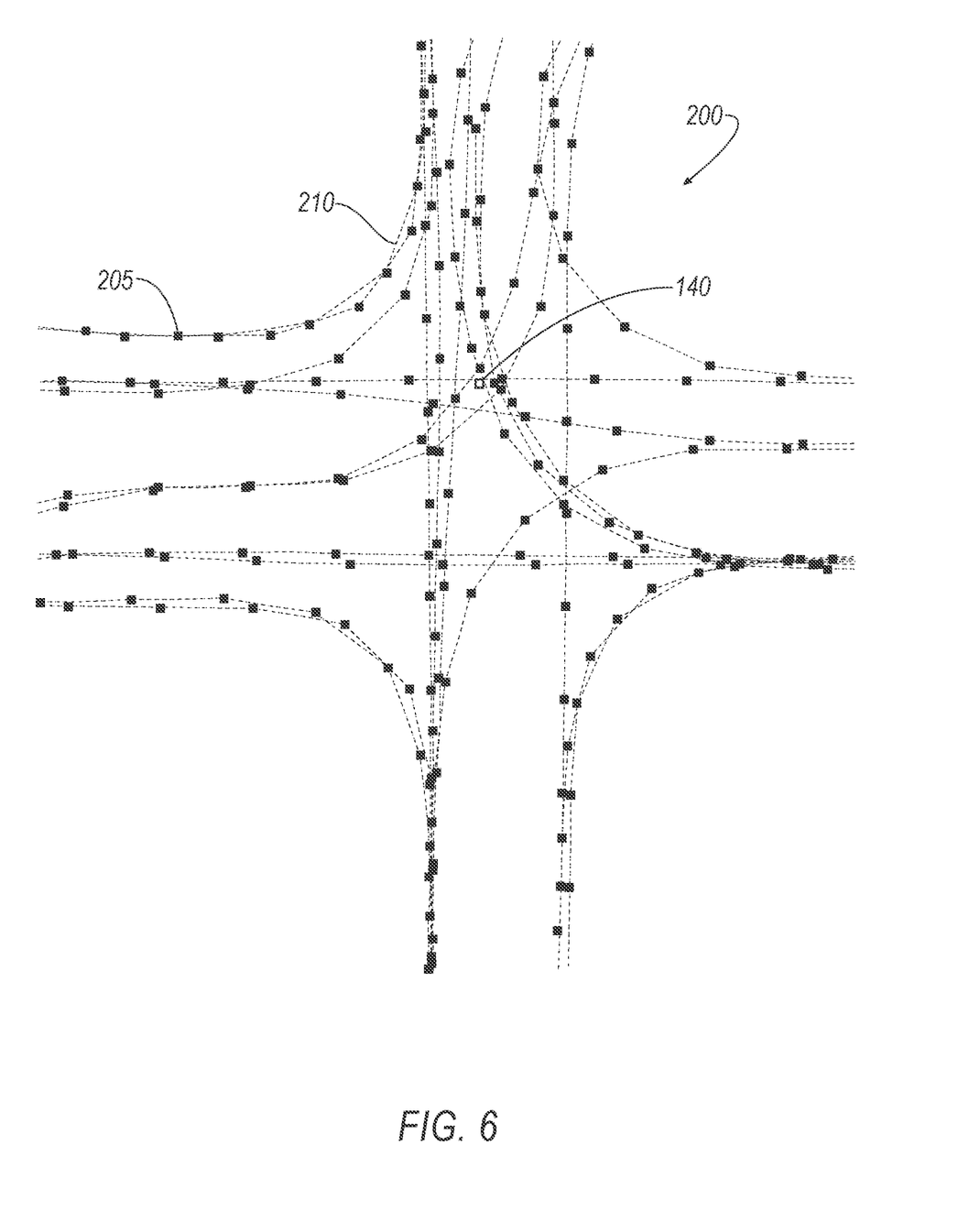
FIG. 6 illustrates a pose graph of nodes representing LIDAR data collection locations after iterative scan matching processes are performed and then an infrastructure node is added.

FIG. 6 illustrates a pose graph of nodes 205 representing LIDAR data collection locations after iterative scan matching processes are performed and then an infrastructure node 140 is added. A LIDAR 150 fixed to the node 140 will be used to generate point cloud data 215 for an area 100, e.g., to be provided in a map or as data for vehicles 101 in the area 100. Therefore, it is desirable, as explained above, to localize the node 140 LIDAR 150, i.e., identify a location according to a coordinate system for the area 100, as precisely as possible. The nodes 205 shown in FIG. 6, having been aligned by a scan matching process such as mentioned above, can serve as ground truth data, i.e., provide static reference points for localizing the node 140 including the LIDAR 150. Thus, the pose graph 200 of FIG. 6 (and also as shown in FIGS. 7 and 8) can be referred to as a reference pose graph 200.

Figure 7:
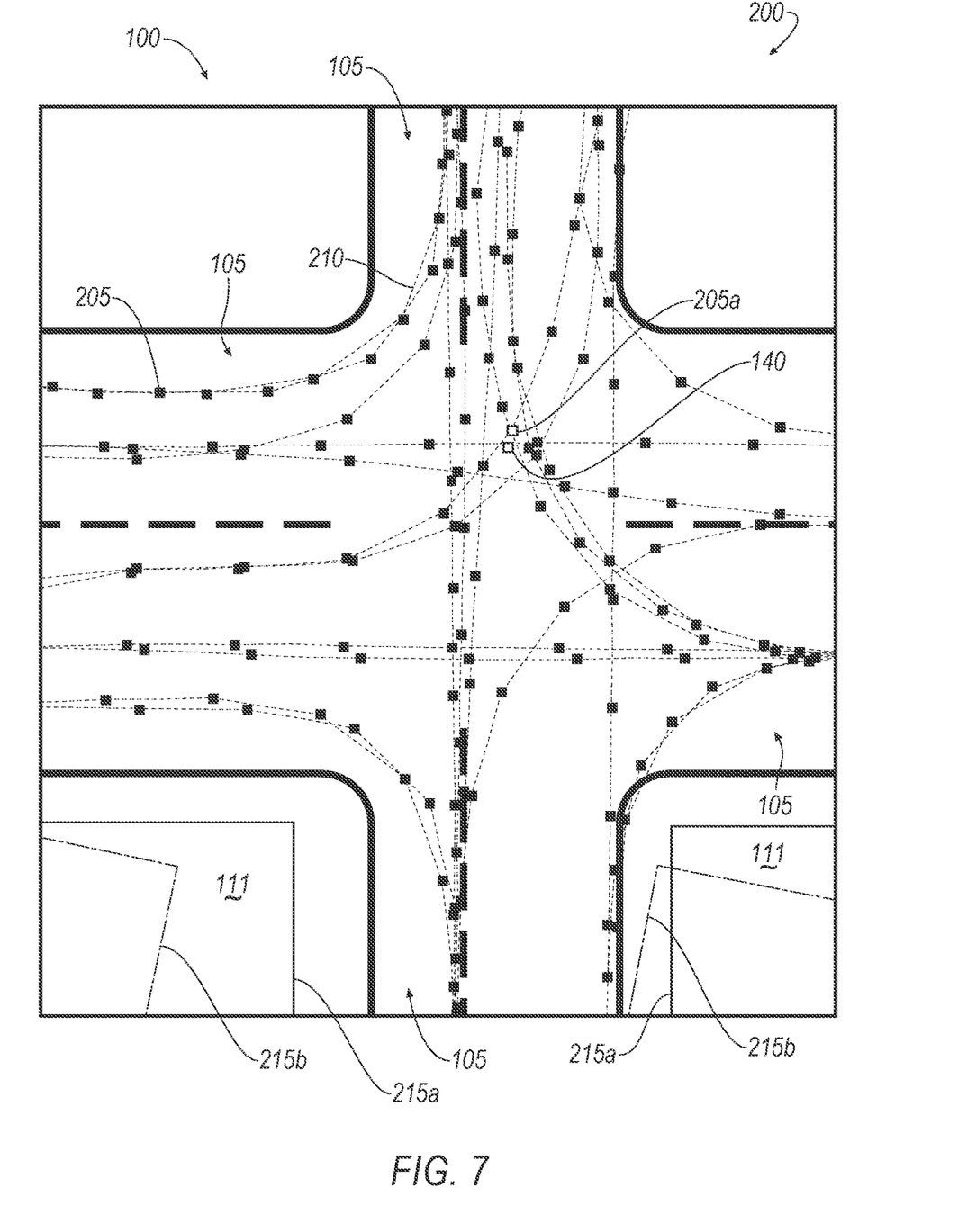
FIG. 7 illustrates a pose graph of nodes representing LIDAR data collection locations after iterative scan matching processes are performed and then an infrastructure node is added, including a misalignment of point cloud data from a LIDAR sensor at the infrastructure node.
Figure 8:
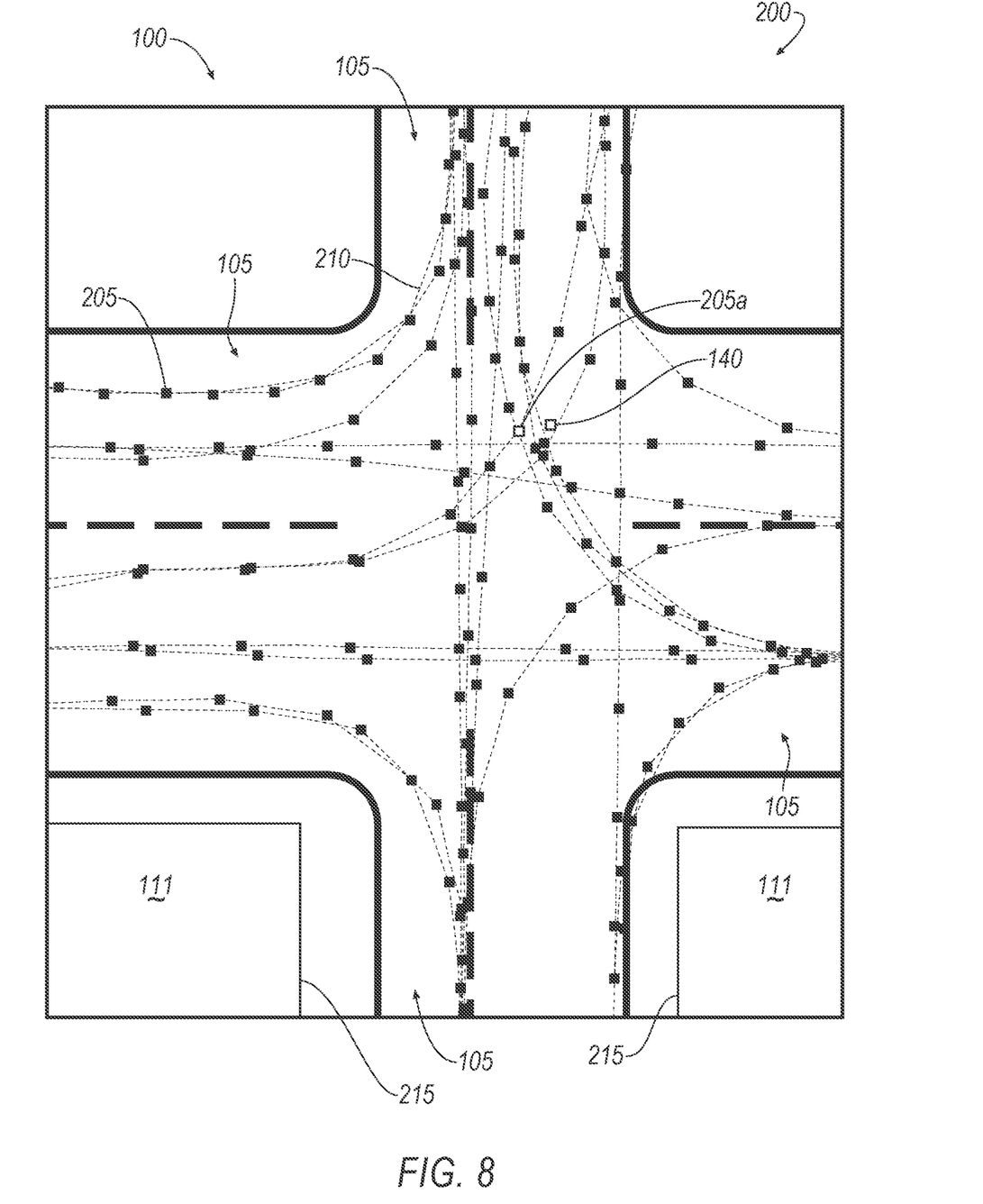
FIG. 8 illustrates the results of a pose graph correction to align the point cloud data from an infrastructure node with aligned or calibrated point cloud data from a plurality of mobile collection nodes.

FIG. 7 illustrates a pose graph of nodes 200 as in FIG. 6 representing LIDAR data collection locations after iterative scan matching processes are performed to provide aligned point cloud data 215a and then an infrastructure node 140 is added, including misaligned point cloud data 215b from a LIDAR sensor 150 at the infrastructure node 140. FIG. 8 illustrates the results of a pose graph correction to align the point cloud data 215b with the point cloud data 215a, i.e., FIG. 8 illustrates a single set of aligned point cloud data 215. By aligning the point cloud data 215b from the stationary node 140 with the aligned point cloud data 215a from the plurality of mobile collection nodes 205, a corrected pose graph 200 including a corrected location of the stationary node 140, e.g., with respect to a coordinate system such as the GPS coordinate system, of the node 140 can be specified.

Figure 9:
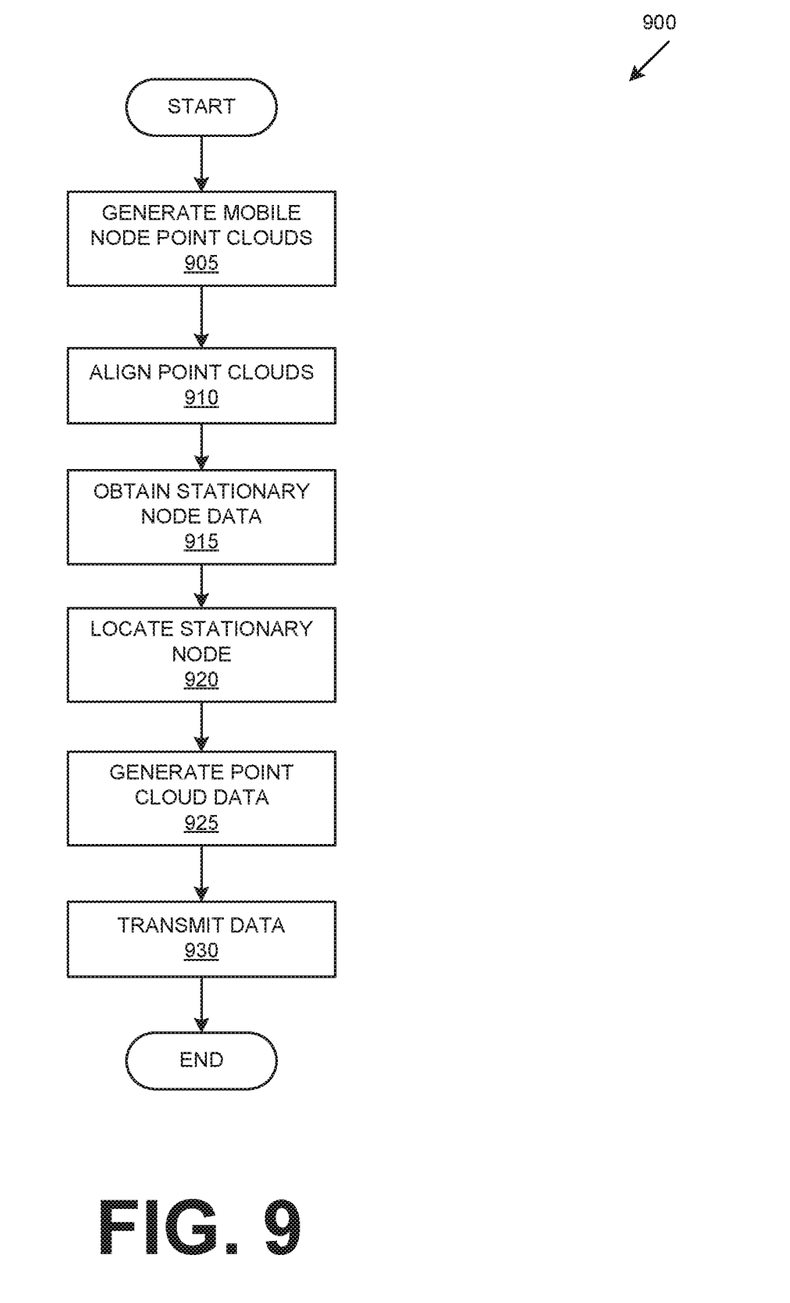
FIG. 9 illustrates an exemplary process for calibrating or identifying a location of a stationary node including a LIDAR.

FIG. 9 illustrates an exemplary process 900 for calibrating or identifying a location of a stationary node 140 including a lidar 150, so that data from the node 140 at the identified location can be provided for operation of vehicles 101. The process 900 can be carried out according to program instructions executed by a processor of a vehicle 101 computer 110, a node 140 computer 145 and/or some other general purpose computer, e.g., a remote server or other computer at a remote location to which point cloud data 215 could be uploaded and processed as described herein.

The process 900 begins in a block 905, in which a robot, mapping vehicle 101, or other mobile mechanism is used to obtain point cloud data 215 at a plurality of mobile node 205 locations, e.g., as described above with respect to FIGS. 2-4.

Next, in a block 910, the point cloud data 215 from various respective mobile nodes 205 is aligned, e.g., according to an iterative scanning matching process or the like as mentioned above.

Next, in a block 915, point cloud data 215 from a stationary infrastructure node 140 LIDAR 150 is obtained.

Next, in a block 920, the stationary node 140 is located by aligning the node 140 point cloud data 215 with aligned point cloud data 215 from mobile nodes 205, e.g., as described above. The node 145 computer 145 can store the location, e.g., a set of three-dimensional coordinates, e.g., including a sensor 150 height and geo-coordinates, which can then be used in specifying locations of objects or phenomena indicated in the area 100, e.g., on a map or other data specifying objects or phenomena that may be provided via transmission to proximate vehicles 101, i.e., vehicles 101 in the area 100.

Next, in a block 925, the lidar 150 collects point cloud data 215, which can be provided to and/or stored by the computer 145. Further, the computer 145 can use the point cloud data 215 in a map of the area 100, to specify locations of objects in the area 100, etc. That is, the node 140 LIDAR 150 can provide data 215 to detect an object, and an object location can be specified according to, i.e., relative to or in a common coordinate system with, the location of the stationary node as determined in the block 920.

Next, in a block 930, the computer 145 provides point cloud data 215, data about objects in the area 100, and/or a map of the area 100, via a transmission, typically a broadcast transmission via a V2X or V2V protocol or the like for vehicles 101 in the area 100. The vehicles 101 can then use the provided data for operations, e.g., as input to algorithms whose output can be a command to actuate a vehicle 101 component, e.g., propulsion to accelerate a vehicle 101 or maintain a speed of the vehicle 101, braking to break or decelerate the vehicle 101, steering to steer the vehicle 101, etc.

Following the block 930, the process 900 ends.

As used herein, the term "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   generate a reference pose graph from first point cloud data collected at, and transmitted to the computer from, each of a plurality of mobile nodes, the reference pose graph including respective locations of the mobile nodes when the first point cloud data was collected, the locations being aligned according to a common coordinate system; and
   then, after the locations of the mobile nodes are aligned to the reference pose graph, align the reference pose graph to second point cloud data collected by a stationary node to specify a location of the stationary node based on the reference pose graph and second point cloud data collected by the stationary node.

2. The method of claim 1, wherein the first and second point cloud data is LIDAR sensor data.

3. The method of claim 1, wherein the stationary node includes a LIDAR sensor and at least one of a two-dimensional imaging sensor, a radar, or an ultrasonic sensor.

4. The method of claim 1, wherein the reference pose graph is generated by applying an iterative scan matching process to the first point cloud data.

5. The method of claim 1, further comprising detecting an object at the stationary node, and specifying an object location according to the location of the stationary node.

6. The method of claim 5, further comprising transmitting the object location to a vehicle.

7. The method of claim 6, further comprising, in the vehicle, actuating a component according to the object location.

8. The method of claim 1, wherein the location of the stationary node is specified in three dimensions.

9. A system, comprising a computer comprising a processor and a memory, the memory storing instructions executable by the processor to:
   generate a reference pose graph from first point cloud data collected at, and transmitted to the computer from, each of a plurality of mobile nodes, the reference pose graph including respective locations of the mobile nodes when the first point cloud data was collected, the locations being aligned according to a common coordinate system; and
   then, after the locations of the mobile nodes are aligned to the reference pose graph, aligning the reference pose graph to second point cloud data collected by a stationary node to specify a location of the stationary node based on the reference pose graph and second point cloud data collected by the stationary node.

10. The system of claim 9, wherein the first and second point cloud data is LIDAR sensor data.

11. The system of claim 9, wherein the stationary node includes a LIDAR sensor and at least one of a two-dimensional imaging sensor, a radar, or an ultrasonic sensor.

12. The system of claim 9, wherein the reference pose graph is generated by applying an iterative scan matching process to the first point cloud data.

13. The system of claim 9, the instructions further including instructions to detect an object at the stationary node, and specify an object location according to the location of the stationary node.

14. The system of claim 13, the instructions further including instructions to transmit the object location to a vehicle.

15. The system of claim 14, wherein the vehicle actuates a component according to the object location.

16. The system of claim 9, wherein the location of the stationary node is specified in three dimensions.

17. A system, comprising:
   a mobile LIDAR sensor;
   a stationary infrastructure node;
   a LIDAR sensor mounted to the infrastructure node; and
   a computer comprising a processor and a memory, the memory storing instructions executable by the processor to:
      generate a reference pose graph from first point cloud data collected at, and transmitted to the computer from, each of a plurality of mobile nodes, the reference pose graph including respective locations of the mobile nodes when the first point cloud data was collected, the locations being aligned according to a common coordinate system; and
      then, after the locations of the mobile nodes are aligned to the reference pose graph, align the reference pose graph to second point cloud data collected by a stationary node to specify a location of the stationary node based on the reference pose graph and second point cloud data collected by the stationary node.

18. The system of claim 17, further comprising at least one of a two-dimensional imaging sensor, a radar, or an ultrasonic sensor mounted to the stationary node.

19. The system of claim 17, wherein the reference pose graph is generated by applying an iterative scan matching process to the first point cloud data.

20. The system of claim 17, the instructions further including instructions to detect an object at the stationary node, and specify an object location according to the location of the stationary node.

\* \* \* \* \*